Feb. 6, 1945. E. H. WITTENBERG 2,368,795
PRESSURE COOKER
Filed Jan. 23, 1943 2 Sheets-Sheet 1
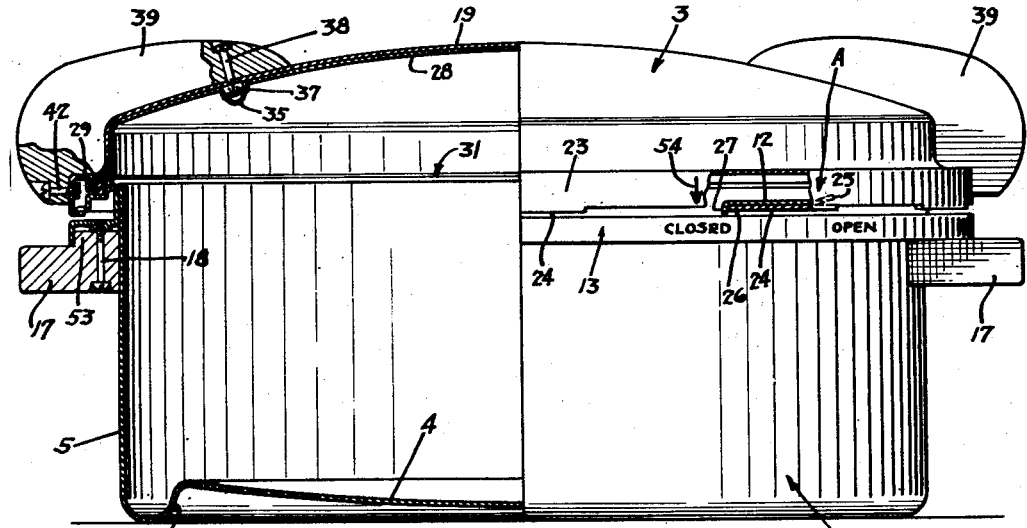
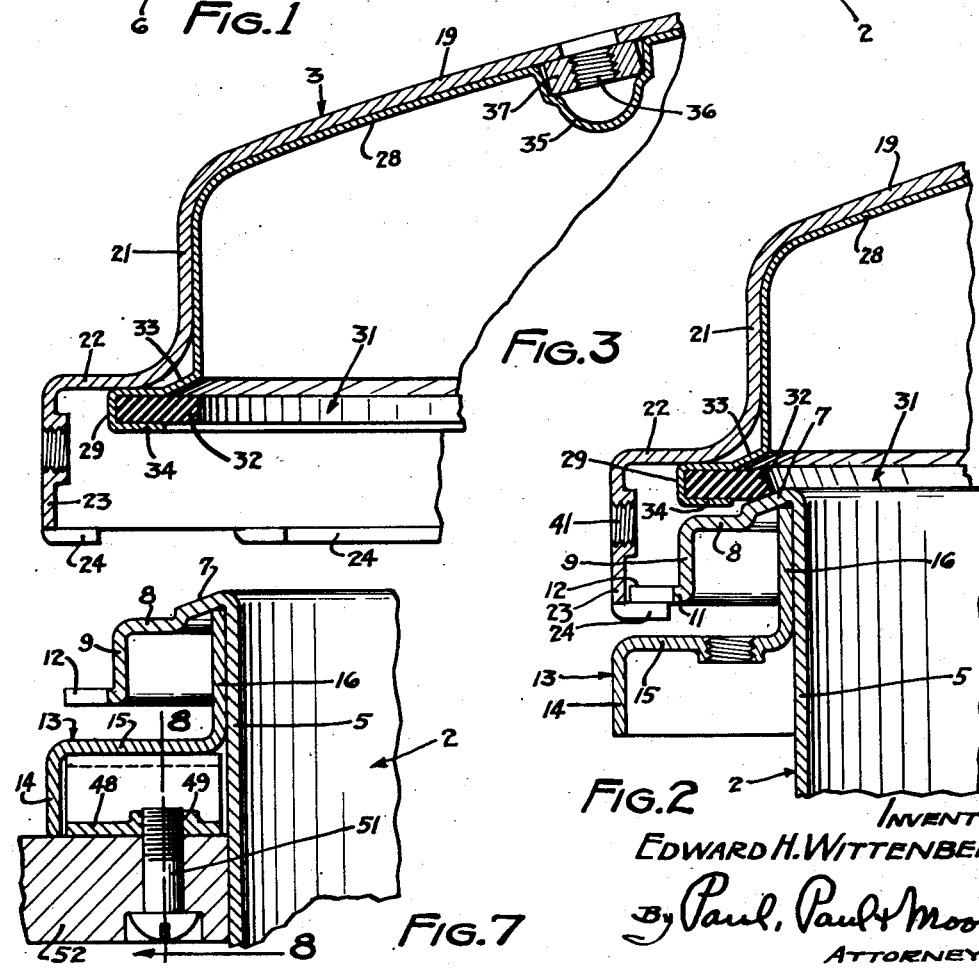
INVENTOR
EDWARD H. WITTENBERG
By Paul, Paul & Moore
ATTORNEYS

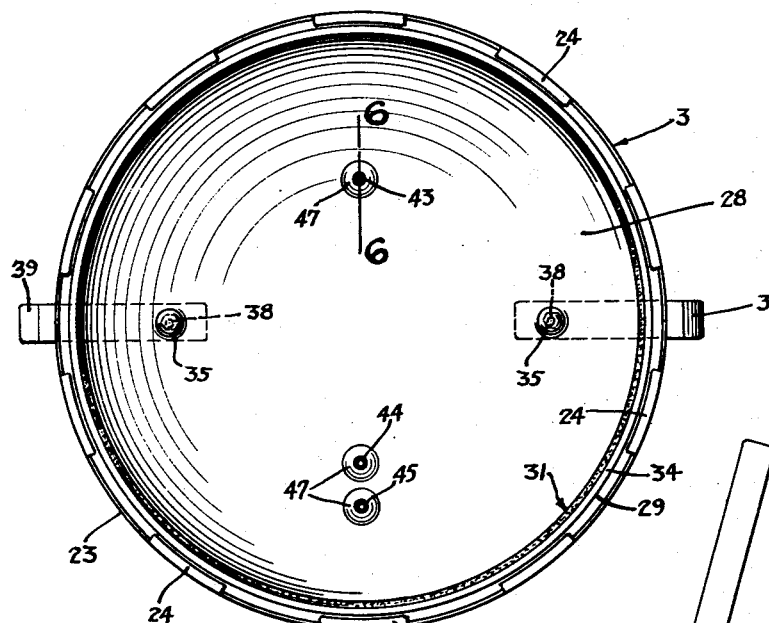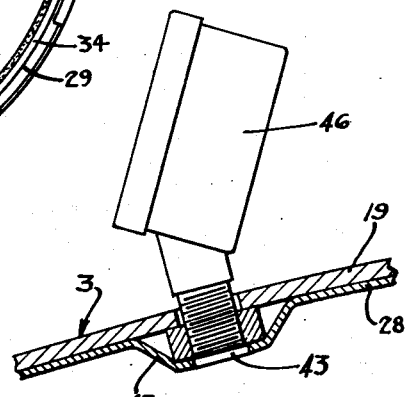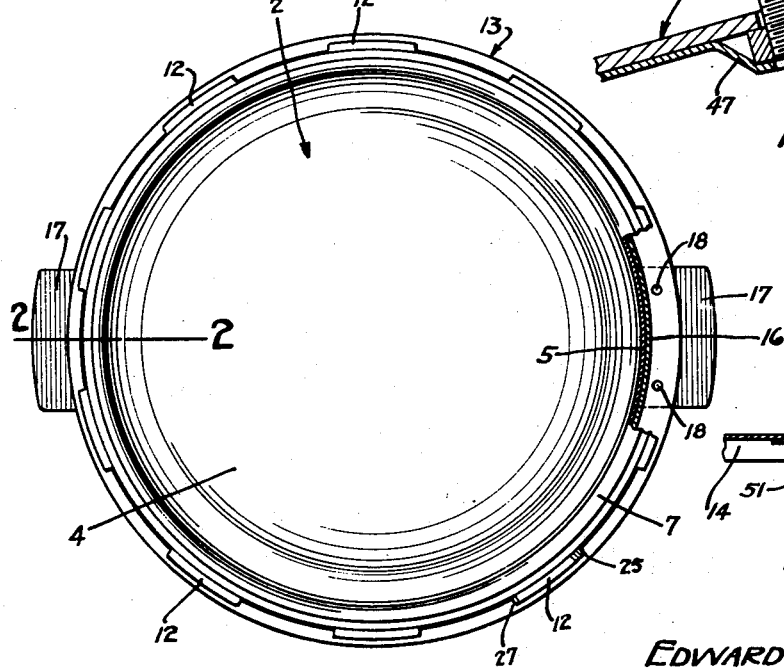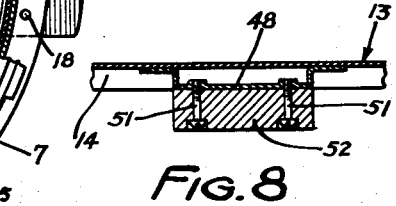

Patented Feb. 6, 1945

2,368,795

UNITED STATES PATENT OFFICE 2,368,795

PRESSURE COOKER

Edward H. Wittenberg, Eau Claire, Wis., assignor to National Pressure Cooker Company, Eau Claire, Wis., a corporation of Wisconsin Application January 23, 1943, Serial No. 473,316

5 Claims. (Cl. 220—46)

This invention relates to new and useful improvements in pressure cookers, and more particularly to such a cooker construction of sheet metal.

Heretofore it has been fore or less common practice to construct pressure cookers of cast aluminum, although some cookers have been made of sheet metal. Aluminum, in any form, is now practically unobtainable for commercial or domestic use, because of the defense program. To overcome the shortage of aluminum for devices of this general type, applicant has conceived the idea of constructing pressure cookers of a suitable sheet metal which may readily be formed into various shapes by suitable equipment, after which the cooker body and its cover is processed or treated with a suitable preservative to prevent rust and disintegration of the metal under normal operating conditions.

An object of the present invention therefore is to provide a sheet metal pressure cooker which is so designed and constructed that it has the appearance of a cast metal cooker, and in which the cooker body and cover are provided with co-acting lugs adapted for interlocking engagement to secure the cover to the cooker body in seal tight relation.

A further object is to provide an apparatus of the class described, comprising a container having its upper marginal edge formed with an outwardly turned flange to provide an annular seat, and a cover comprising a top wall and a side wall, the latter having its lower edge portion bent outwardly and downwardly and provided with inwardly directed circumferentially spaced lugs adapted to interlock with co-acting lugs provided on the cooker body, thereby to secure the cover to the cooker body.

A further object is to provide a pressure cooker comprising a container having its upper marginal edge wall bent outwardly and downwardly to provide an annular conical seat, and said edge portion extending outwardly beyond said seat and being bent downwardly to provide a cylindrical wall portion having its lower edge provided with a plurality of outwardly directed spaced lugs, and an annular trim member being secured to the container body below said lugs and having its periphery disposed beyond the periphery of the lugs, thereby to provide a protection for the lugs and also a supporting means for suitable carrying or operating handles provided on the cooker body.

A further object is to provide a cover for a pressure cooker, which is constructed of sheet metal and has its lower wall portion bent outwardly and downwardly to conceal the radially disposed lugs provided on the cooker body, and an annular inwardly facing channel member being secured to the cover and supporting a flexible sealing element or gasket whose inner-marginal edge portion is unsupported by said channel member and is adapted to engage the annular seat provided on the cooker body, whereby the sealing element or gasket may flex when the cover is secured to the cooker body, thereby to provide a leak-tight joint between the cover and the cooker body.

Other objects of the invention reside in the novel construction of the cover which comprises an inner-lining member which preferably is permanently secured within the cover and has its lower marginal edge portion formed to provide an annular inwardly facing channel adapted to receive a flat gasket arranged to engage the seat provided on the cooker body, when the cover is placed thereon, the inner upper portion of the gasket being exposed to the pressure within the cooker body whereby such pressure will firmly hold the gasket in sealing engagement with its seat; in the dual wall construction of the cover; in the novel construction of the upper marginal wall portion of the container body which is formed with an outwardly turned annular flange having a seat for the cover and also means adapted for interlocking engagement with the cover; and in the provision of a reinforcing ring at the upper of the cooker body below the cover engaging lugs, which ring greatly strengthens the upper portion of the cooker body and provides a protection for said lugs and, in addition, provided on the outwardly turned flange of the cooker, greatly enhances the appearance of the cooker.

Other objects of the invention will appear from the following description and accompanying drawings and will be pointed out in the annexed claims.

In the accompanying drawings there has been disclosed a structure designed to carry out the various objects of the invention, but it is to be understood that the invention is not confined to the exact features shown, as various changes may be made within the scope of the claims which follow.

In the drawings:

Figure 1 is an elevational view partially in section, showing my improved pressure cooker with the cover secured thereto;

Figure 2 is an enlarged detail sectional view on the line 2—2 of Figure 5 with each in place, showing the supporting means for the sealing element or gasket, and also the means for locking the cover in sealing engagement with the cooker body;

Figure 3 is a detail sectional view showing only the construction of the marginal edge portion of the cover;

Figure 4 is a bottom or inside view of the cover only;

Figure 5 is a plan view of the cooker body only;

Figure 6 is an enlarged detail sectional view on the line 6—6 of Figure 4;

Figure 7 is an enlarged detail sectional view similar to Figure 2, but showing another method of securing the handles to the cooker body; and Figure 8 is a detail sectional view on the line 8—8 of Figure 7.

The novel pressure cooker herein disclosed, is shown comprising a body or container, generally designated by the numeral 2, having a cover 3 removably supported thereon. The cooker body is shown comprising a bottom wall 4 and a cylindrical side wall 5, jointed to the bottom wall 4 by an annular bead-like wall portion 6, which provides the bottom support for the cooker body, as will readily be understood by reference to Figure 1.

A feature of the present invention resides in the unique formation of the upper portion of the cooker body. As clearly illustrated in the drawings, particularly Figures 1 and 2, the container body is constructed of sheet metal which is formed to provide the body of the cooker and has its upper marginal edge portion bent outwardly to provide an annular seat 7, and a horizontally disposed wall or flange 8. The flange 8 is bent downwardly to provide a cylindrical wall portion 9 having its lower marginal edge portion 11 formed with a plurality of circumferentially spaced radial lugs 12, as clearly illustrated in Figures 2 and 5. The lugs 12 are disposed in a horizontal plane located below the elevation of the seat 7, as best shown in Figure 2, whereby the upper marginal edge portion of the cooker body is strengthened as will be understood. The seat 7 is preferably conical in shape, as shown in Figures 2 and 7.

To further strengthen the upper portion of the cooker body and to enhance the appearance thereof, a suitable trim ring, generally designated by the numeral 13, is secured to the cooker body as clearly illustrated in Figure 2. The trim ring 13, as herein shown, is substantially Z-shaped in cross section, and comprises an upper vertical wall portion 14, a horizontal wall portion 15, and a vertical wall portion 16, the latter being suitably fitted and secured to the side wall 2 of the cooker body, as will be understood by reference to Figure 2.

The periphery of the trim ring 13 extends beyond the periphery of the lugs 12, as shown in Figures 2 and 7, whereby the trim ring provides a protection for the lugs, in the event the cooker body engages an obstruction or is dropped on its side. The trim ring further provides a supporting means for suitable carrying handles 17 which preferably are shaped as shown in Figure 1 and are secured to the ring by suitable screws 18.

The cover for the cooker body is shown comprising a top wall 19 and a side wall 21 whose lower edge is bent outwardly and downwardly to provide a horizontal wall portion 22 and a cylindrical wall portion 23, as best shown in Figure 3. The lower marginal edge of the cylindrical wall portion 23 is provided with inwardly directed circumferentially spaced lugs 24 adapted to interlock with the outwardly directed lugs 12 of the cooker body as clearly illustrated in Figure 2. The spacing between the lugs 12 of the cooker body is slightly greater than the peripheral length of the lugs 24 of the cover, and in like manner the spacing between the lugs 24 of the cover is relatively greater than the peripheral length of the lugs 12 of the cooker body. By thus proportioning the lugs and the spaces therebetween, the lugs on the cover may readily pass between the lugs on the cooker body in the operation of placing the cover on the cooker, or removing it therefrom.

The leading ends 25 of the lugs 12 of the cooker body are preferably slightly upwardly inclined, as shown at A in Figure 1, whereby the leading ends 26 of the cover lugs 24 may readily pass under the cooker body lugs 12, when fitting the cover onto the cooker body. If desired, the leading ends 26 of the cover lugs 24 may be slightly downwardly inclined, but from actual experience I have found this to be unnecessary.

Means is provided for limiting relative rotation of the cover on the cooker body, and, as best shown in Figure 1, may reside in the provision of a suitable abutment 27, preferably formed on one end of one of the cooker body lugs 12, as shown in Figure 1. The abutment 27 is so located that when the cover is placed upon the cooker body with its lugs 24 registering with the spaces between the cooker body lugs 12, it will be engaged by one of the lugs on the cover, when the cover is relatively rotated on the cooker body to move its lugs 24 into interlocking engagement with the lugs 12 of the cooker body, as plainly shown in Figure 1.

To reinforce the cover 2, a suitable inner member 28 is fitted to the inside of the cover and suitably secured thereto, as shown in Figure 3. The inner member is provided at its lower edge with an inwardly facing channel member 29 adapted to receive a suitable sealing element or gasket 31. The width of the gasket 31 is relatively greater than the depth of the channel member 29, whereby the inner edge portion 32 of the gasket may engage the seat 7 of the cooker body to provide a leak-tight connection between the cover and cooker body.

To permit free upward flexing of the inner edge 32 of the gasket, the wall portion 33 of the inner cover member 28, is upwardly inclined as shown in Figures 2 and 3, whereby the gasket is free to flex, as clearly illustrated in Figure 2. It will also be noted by reference to Figures 2 and 7 that the horizontal wall portion 8 of the upper portion of the cooker body is depressed or downwardly offset to provide adequate clearance for the lower wall 34 of the channel member 29.

Raised portions 35 are preferably provided in the wall of the inner member 28 adapted to conceal the threaded openings 36 provided in the top wall 19 of the cover, as shown in Figure 3. A suitable nut 37 may be secured to the wall 19 of the cover to provide adequate thickness in the metal for receiving the threaded terminals of screws 38 which secure handles 39 to the cover as clearly illustrated in Figure 1.

By reference to Figures 1 and 2, it will be noted that the cylindrical wall portion 23 of the cover is also provided with threaded apertures 41 for receiving screws 42 which secure the outer portions of the handles to the cover.

The top wall 19 of the cover is shown provided with threaded apertures 43, 44 and 45 adapted to receive the usual fittings such as the pressure gauges 46, shown in Figure 6, and a pressure release valve and a safety valve. The inner wall member 28 is provided with offset portions 47 at the apertures 43, 44 and 45, whereby the fittings secured to the cover may be in connection with the interior of the pressure cooker when the cover is secured thereto.

In Figures 7 and 8 there is shown a slightly different construction for securing the cooker body handle thereto. In the form here shown, suitable brackets 48 are fitted into the downwardly facing annular recess provided by the trim ring 13, and these brackets are provided with threaded apertures 49 adapted to receive the threaded terminals of screws 51 which secure handles 52 to the cooker body.

The handles shown in Figures 7 and 8, may be of wood or any other suitable material applicable for the purpose. They are secured to the lower horizontal wall portion of the brackets 48 as will be understood by reference to Figures 7 and 8. By referring to Figure 7, it will be noted that the bottom surface of the horizontal walls of the brackets 48 are disposed in the plane of the lower edge of the trim ring, which is desirable when securing flat handles to the brackets 48, as will be understood by reference to Figure 7.

In the form shown in Figures 1 and 2, it will be noted that the handles 17 are provided with upright portions 53 adapted to be fitted into the annular recess provided in the trim ring, as best illustrated in Figure 1.

The novel pressure cooker herein disclosed has been found extremely practical and efficient in operation. Its construction is such that it may be manufactured in quantity production at small cost from relatively thin sheet metal which is so shaped and fashioned as to provide a very rugged structure. The trim ring 13, as hereinbefore stated, in addition to providing a supporting means for the handles 17 of the cooker body, provides a protection for the lugs 12 of the cooker body, as it extends outwardly beyond the outer ends of the lugs, as best shown in Figure 7. Thus, should the cooker body be dropped on its side, there is little danger of the lugs 12 becoming damaged as a result of the trim ring 13.

The cover 3 is also strengthened by the unique formation of the wall portions 22 and 23, as will readily be understood by reference to Figures 2 and 3. The cylindrical wall portion 23 of the cover is preferably of the same diameter as the diameter of the trim ring 13, whereby when the cover is fitted on the cooker body, as shown in Figures 1 and 3, the structure presents a very neat design which has the appearance of ruggedness and stability.

To facilitate placing the cover on the cooker body or removing it therefrom, suitable indication marks are preferably provided, as shown in Figure 1. As here shown, a suitable arrow 54 may be provided on the periphery of the wall portion 23 of the cover, adapted to register with two indication marks, such as the words "Closed" and "Open," provided on the periphery of the trim ring 13, as shown in Figure 1. When the arrow is in a position over the word "Closed" as shown in Figure 1, the lugs 24 of the cover will be interlocked with the cooker body lugs 12, whereby the cover is secured to the cooker body. When it is desired to release the cover from the cooker body, the operator grasps the cover handles 39 and rotates the cover in a counterclockwise direction until the arrow registers with the word "Open," whereupon the cover lugs 24 will be in registry with the spaces between the cooker body lugs 12. When the cover lugs are so positioned, the cover may readily be lifted off the cooker body, as will be readily understood.

The cooker herein described in addition to providing the utmost in strength and durability, is extremely light in weight because of its sheet metal construction. No cast aluminum is utilized in the manufacture thereof, which is of utmost importance in times like these when aluminum is practically unobtainable.

It will be apparent to those skilled in the art that I have accomplished at least the principal objects of my invention, and it will also be apparent to those skilled in the art that the embodiments herein described may be variously changed and modified, without departing from the spirit of the invention, and that the invention is capable of uses and has advantages not herein specifically described; hence it will be appreciated that the herein disclosed embodiments are illustrative only, and that my invention is not limited thereto.

I claim as my invention:

1. A pressure cooker comprising a body having its upper marginal edge formed with an outwardly turned flange to provide an annular seat, said flange extending outwardly beyond said seat and thence downwardly, a plurality of circumferentially spaced radial lugs on the lower edge of said flange, whereby said lugs are disposed at an elevation below said seat, an annular member secured to the upper portion of the cooker body and extending beyond said lugs to protect them against damage, a cover for the cooker body, means on the cover providing a radially inwardly facing annular channel, a flat gasket having its outer marginal edge portion supported in said channel, the width of said gasket being relatively greater than the radial depth of the channel whereby the inner unsupported edge portion of the gasket may flex when engaged with said seat upon placing the cover on the cooker body, and a plurality of inwardly directed lugs on the cover adapted for interlocking engagement with the lugs on the cooker body, thereby to secure the cover to the cooker body in leak-proof relation.

2. In an apparatus of the class described, a container body having its upper marginal edge portion formed with an outwardly and downwardly turned flange, the upper portion of said flange providing an annular seat, a cover for the container comprising top and side walls, means on the container body and cover adapted for interlocking engagement to secure the cover to the container body, a radially inwardly facing annular channel member fitted into and secured to the cover, an annular flat gasket supported in the channel member, the cross sectional width of the gasket being relatively greater than the radial depth of said channel member whereby the inner edge portion of the gasket projects from the channel and may flex when engaged with said seat upon placing the cover on the container body, an annular reinforcing member secured to the container body below the downwardly turned flange of the cover in slightly spaced relation thereto when the cover is secured to the container body, and carrying handles secured to the under side of said reinforcing member independently of the container body, said handles having concave faces fitting against the periphery of the container body.

3. In an apparatus of the class described, a container formed of sheet metal and having its upper marginal edge portion formed with an outwardly turned flange to provide an annular seat, a plurality of circumferentially spaced radial lugs on the periphery of said flange, a sheet metal cover for the container comprising top and side walls, an inner member having top and side wall portions fitting against and secured to the corresponding wall portions of the cover and having its marginal edge bent outwardly, downwardly and inwardly to provide a radially inwardly facing annular channel disposed in a horizontal plane, a flat gasket having its outer marginal edge portion supported in said channel, the width of said gasket cross sectionally being relatively greater than the radial depth of the channel whereby the inner edge portion of the gasket projects from the channel in a position to engage said seat when the cover is placed on the container, the gasket being so related to the seat that when the cover is secured to the container the inner marginal edge portion of the gasket is flexed upwardly, and a plurality of inwardly directed lugs on the cover adapted for interlocking engagement with lugs on the container, thereby to secure the cover to the container in leak-proof relation.

4. In an apparatus of the class described, a container having its upper marginal edge portion formed with an outwardly turned flange to provide an annular seat, a plurality of circumferentially spaced lugs on the periphery of said flange, a sheet metal cover for the container comprising top and side walls, an inner sheet metal member fitted into the cover and secured thereto, the wall of said inner member being relatively thinner than the wall of the cover and formed to simulate substantially the shape of the cover, said inner cover member having its marginal edge portion bent outwardly, downwardly and inwardly to provide a radially inwardly facing channel disposed in a horizontal plane, an annular flat gasket having its outer marginal edge portion fitting in said channel, the width of the gasket, cross sectionally, being relatively greater than the radial depth of the channel whereby the inner edge portion of the gasket is unsupported and may flex when engaged with said seat upon securing the cover to the container, and a plurality of inwardly directed spaced lugs on the lowermost portion of the cover adapted for interlocking engagement with the lugs on the container, thereby to secure the cover to the container in leaktight relation.

5. In an apparatus of the class described, a container formed of sheet metal and having its upper marginal edge portion formed with an outwardly turned flange providing an annular seat, said flange extending outwardly beyond said annular seat and bent downwardly to provide a cylindrical wall portion, a plurality of circumferentially spaced, radial lugs on the lower edge of said cylindrical wall portion, a sheet metal cover for the container comprising top and side walls, a sealing gasket secured to the cover and adapted to engage said seat when the cover is placed on the container, means on the container and cover adapted for interlocking engagement to secure the cover to the container in leaktight relation, and an annulus of Z-shaped cross section fitted to the exterior of the container body adjacent to the open top thereof and permanently secured thereto with its horizontal wall spaced downwardly from the outwardly directed lugs on the container body, said annulus reinforcing the upper portion of the container and having a cylindrical wall extended radially outwardly beyond the outer terminals of the container body lugs, thereby to provide a protection for said lugs, should the container be placed upon its side.

EDWARD H. WITTENBERG.